United States Patent [19]

Bunce

[11] Patent Number: 5,177,465
[45] Date of Patent: Jan. 5, 1993

[54] TRAILER LOW TIRE PRESSURE INDICATOR APPARATUS

[76] Inventor: Donald E. Bunce, 6136 Hunter St., Ventura, Calif. 93003

[21] Appl. No.: 756,517

[22] Filed: Sep. 9, 1991

[51] Int. Cl.⁵ .......................................... B60C 23/02
[52] U.S. Cl. .................................. 340/443; 340/445
[58] Field of Search ............... 340/443, 442, 448, 445; 200/61.22, 61.23; 116/34 R

[56] References Cited

U.S. PATENT DOCUMENTS

| | | | |
|---|---|---|---|
| 2,499,669 | 3/1950 | Murat | 340/443 X |
| 2,957,058 | 10/1960 | Trott | 340/443 X |
| 3,614,122 | 10/1971 | Herren | 340/443 X |
| 3,715,719 | 2/1973 | Sugiyama | 340/445 |
| 4,330,774 | 5/1982 | Doty | 340/445 |
| 4,742,857 | 5/1988 | Gandhi | 340/445 X |

Primary Examiner—Jin F. Ng
Assistant Examiner—Brian R. Tumm
Attorney, Agent, or Firm—Leon Gilden

[57] ABSTRACT

An indicator assembly is mounted medially between the forward and rear wheels to each side of a trailer assembly of a typical multi-axle trailer. The assembly includes a switch assembly mounted between forward and rear springs of a respective forward and rear axle of the trailer, wherein the switch assembly is operatively associated with a switch actuator mount to include a forward and rear magnet, wherein the switch assembly is actuated upon deflection to one of the forward or rear magnets upon deflation of a forward or rear tire associated with the aforenoted forward or rear axle.

3 Claims, 4 Drawing Sheets

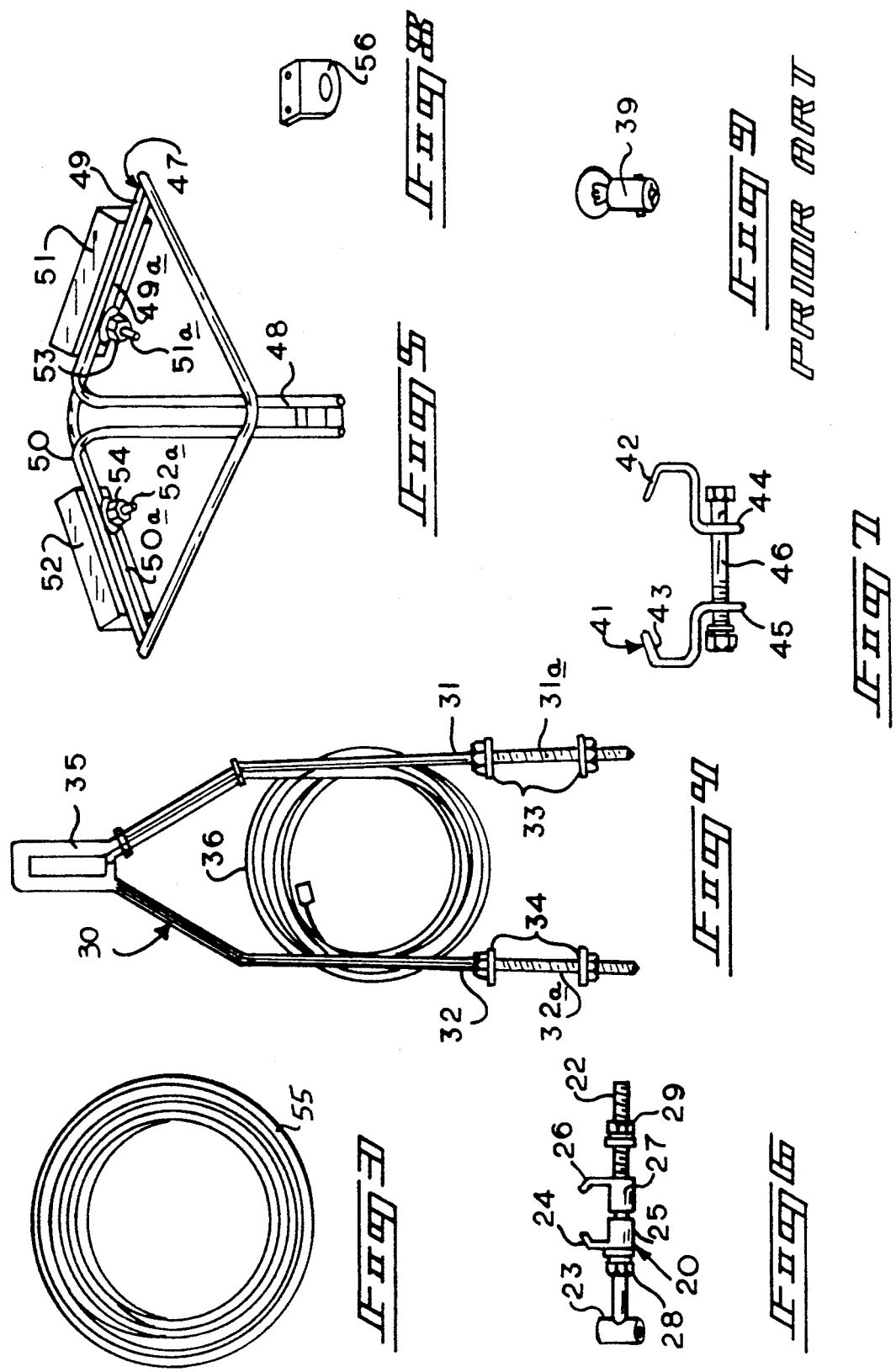

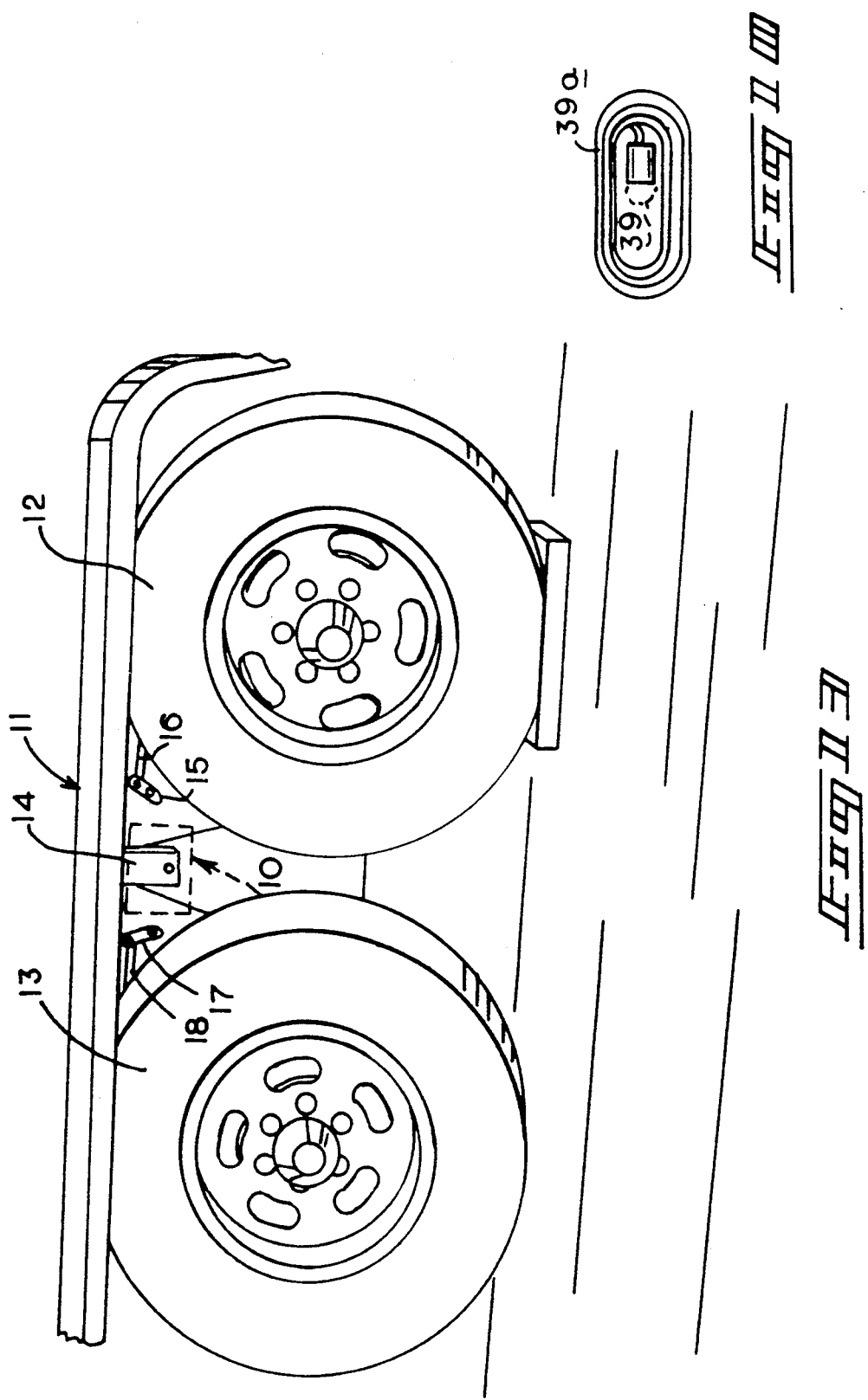

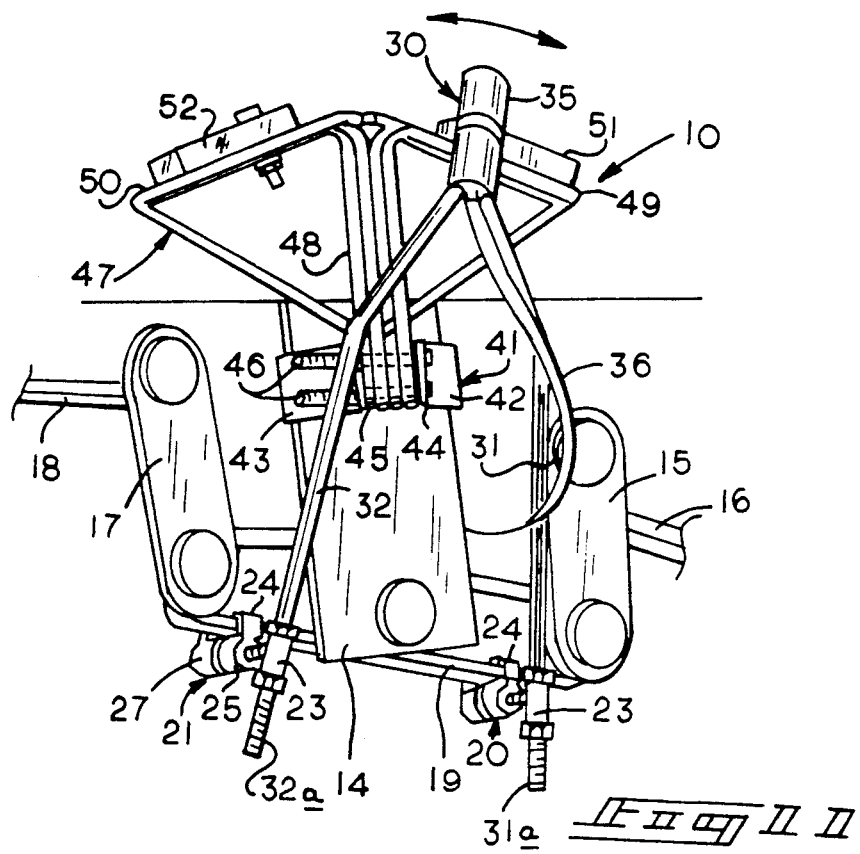
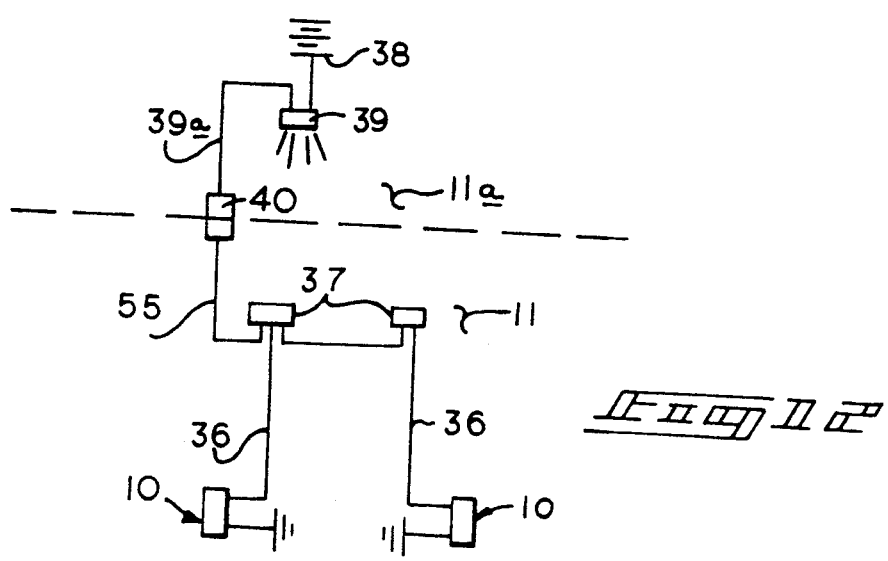

TRAILER LOW TIRE PRESSURE INDICATOR APPARATUS

BACKGROUND OF THE INVENTION

1. Field of the Invention

The field of invention relates to trailer apparatus, and more particularly pertains to a new and improved trailer low tire pressure indicator apparatus to provide indication of low tire pressure in an associated trailer assembly relative to a tire tow vehicle.

2. Description of the Prior Art

In towing a trailer and the like by a tow vehicle, an operator is frequently unaware of relative inflation pressures associated with the tires of a typical multi-axle trailer. Prolonged use of deflated tire pressure relative to such a trailer organization may result in tire damage as well as trailer damage and the failure of a deflated tire due to overheating. Further, there is also potential of fire damage due to the overheating of a deflated tire in use. Prior art structure is available relative to tire pressure sensing organizations and such is exemplified in U.S. Pat. No. 4,807,468 to Galan wherein a vehicle includes a trio of magnets and are mounted in a predetermined fixed circumferential spacing on a wheel, wherein the magnets are arranged to sense displacement of a rotating magnet to afford a sensing and sampling of each wheel sensor in a repetitive sequence to determine low tire pressure.

U.S. Pat. No. 4,866,982 to Gault sets forth another on board tire pressure sensing system wherein a transmitter is mounted in rotative relationship with each tire, and wherein a receiver is disposed to each transmitter to indicate a low tire pressure due to displacement of the tire relative to the receiver.

U.S. Pat. No. 4,479,109 to French sets forth a tire inflation apparatus wherein an arm carried by a rotating wheel normally held retracted by a plunger, wherein deflation of the plunger by relative tire pressure releases the arm radially outwardly of the tire or wheel to contact an element on a vehicle body to effect an alarm.

As such, it may be appreciated that there continues to be a need for a new and improved trailer low tire pressure indicator apparatus as set forth by the instant invention which addresses both the problems of ease of use as well as effectiveness in construction in providing low tire pressure sensing structure operative with multi-axle trailer organizations and in this respect, the present invention substantially fulfills this need.

SUMMARY OF THE INVENTION

In view of the forgoing disadvantages inherent in the known types of low tire pressure sensing apparatus now present in the prior art, the present invention provides a trailer low tire pressure indicator apparatus wherein the same is arranged to provide indication of low tire pressure within tires of a multi-axle trailer assembly. As such, the general purpose of the present invention, which will be described subsequently in greater detail, is to provide a new and improved trailer low tire pressure indicator apparatus which has all the advantages of the prior art tire pressure indicator apparatus and none of the disadvantages.

To attain this, the present invention provides an indicator assembly mounted medially between the forward and rear wheels to each side of a trailer assembly of a typical multi-axle trailer. The assembly includes a switch assembly mounted between forward and rear springs of a respective forward and rear axle of the trailer, wherein the switch assembly is operatively associated with a switch actuator mount to include a forward and rear magnet, wherein the switch assembly is actuated upon deflection of a forward or rear tire associated with the aforenoted forward or rear axle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer low tire pressure indicator apparatus which has all the advantages of the prior art tire pressure indicator apparatus and none of the disadvantages.

It is another object of the present invention to provide a new and improved trailer low tire pressure indicator apparatus which may be easily and efficiently manufactured and marketed.

It is a further object of the present invention to provide a new and improved trailer low tire pressure indicator apparatus which is of a durable and reliable construction.

An even further object of the present invention is to provide a new and improved trailer low tire pressure indicator apparatus which is susceptible of a low cost of manufacture with regard to both materials and labor, and which accordingly is then susceptible of low prices of sale to the consuming public, thereby making such trailer low tire pressure indicator apparatus economically available to the buying public.

Still yet another object of the present invention is to provide a new and improved trailer low tire pressure indicator apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view of a wire harness structure utilized by the invention.

FIG. 4 is an orthographic view of the switch assembly utilized by the invention.

FIG. 5 is an orthographic view of the switch actuator mount utilized by the invention.

FIG. 6 is an isometric illustration of one of a plurality of clamp structures utilized by the invention to mount the switch assembly.

FIG. 7 is an orthographic view of the trailer flange clamp utilized by the invention to mount the switch actuator mount, as set forth in FIG. 5.

FIG. 8 is an isometric illustration of a support bracket utilized by the invention to mount an illumination bulb.

FIG. 9 is an isometric illustration of a typical indicator illumination bulb utilized by the invention.

FIG. 10 is an orthographic top view of the illumination bulb wire harness.

FIG. 11 is an isometric illustration of the invention mounted to an associated trailer structure.

FIG. 12 is an electrical diagrammatic illustration of a typical direct current circuit utilized by the invention.

FIG. 13 is an isometric illustration indicating the orientation of the invention mounted within an associated trailer structure.

DESCRIPTION OF THE PREFERRED EMBODIMENT

Figure 1:
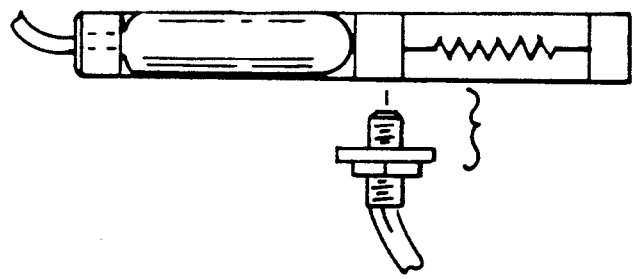
FIG. 1 is a diagrammatic illustration of a prior art low tire pressure indicator apparatus.

With reference now to the drawings, and in particular to FIGS. 1 to 13 thereof, a new and improved trailer low tire pressure indicator apparatus embodying the principles and concepts of the present invention and generally designated by the reference numeral 10 will be described.

Figure 2:
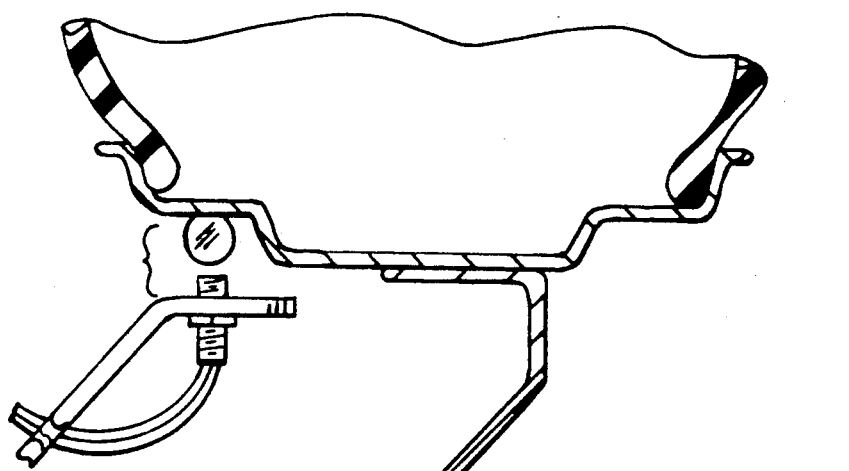
FIG. 2 is an orthographic illustration of the indicator apparatus utilized in the prior art mounted upon an associated vehicle.

FIG. 1 and FIG. 2 illustrate a prior art low tire pressure indicator structure, as set forth in U.S. Pat. No. 4,807,468, wherein two fixed magnet members are operative relative to a third magnet mounted in a circumferential relationship relative to the other magnets, wherein the third magnet is arranged to sense displacement of an associated wheel due to deflation of the associated tire.

More specifically, the trailer low tire pressure indicator apparatus 10 of the instant invention essentially comprises the organization as indicated in use in FIG. 11 mounted to an associated tandem axle trailer assembly 11, as indicated in FIG. 13. The trailer assembly 11 is of a conventional tandem or dual axle construction to mount a plurality of forward axle wheels 12 and a plurality of rear axle wheels 13 to provide a forward and rear wheel 12 and 13, as illustrated in FIG. 13, to each side of the trailer assembly 11. A trailer flange 14 is mounted to the trailer medially of each forward and rear axle wheel 12 and 13, wherein the conventional front and rear axles relative to each wheel are mounted to forward and rear springs 16 and 18 respectively. The forward spring 16 includes a first forward spring hanger and the rear spring 18 includes a first rear spring hanger 17 that are positioned adjacent the trailer flange 14. As illustrated in the FIG. 11, between the first forward and rear spring hangers 15 and 17 is provided a cross brace 19 extending between and secured to lower pivot points of the spring hangers 15 and 17.

The indicator apparatus utilized by the invention includes a "U" shaped switch assembly 30, as indicated in detail in FIG. 4 and in the FIG. 11, that includes a forward leg 31 and a rear leg 32. The forward leg 31 includes a forward leg lower externally threaded portion 31a, with the rear leg 32 including a parallel rear leg lower externally threaded portion 32a. A plurality of clamps defined by a first and second clamp 20 and 21 respectively of identical construction are illustrated in the FIG. 11 and FIG. 6 for example. Each clamp includes an externally threaded rod 22 slidably mounting a forward and rear clamp leg tube 25 and 27 respectively. The forward and rear clamp leg tubes orthogonally mount a respective forward and rear clamp leg 24 and 26 in a confronting relationship. The forward and rear clamp legs 24 and 26 of each of the first and second clamps 20 and 21 are arranged to be fastened to and orthogonally secured to the cross brace 19 in a spaced parallel relationship, as illustrated in FIG. 11, with the first clamp leg 20 positioned adjacent the first forward spring hanger 15 and the second clamp 21 positioned adjacent the first rear spring hanger 17. The use of a forward and rear internally threaded fastener 28 and 29 threadedly secured to the externally threaded rod 22 are rotative relative to one another to effect projection of the forward and rear clamp legs towards one another in the clamping of the cross brace 19. A forward distal end of the externally threaded rod 22 of each clamp 20 and 21 mounts a respective mounting conduit 23 thereon. The mounting conduit 23 includes an axis orthogonally arranged relative to the threaded rod 22. Through the respective mounting conduit 23 of the first and second clamps 20 and 21 is received the respective forward leg or externally threaded portion 31a and the rearwardly externally threaded portion 32a. Spaced forward and rear leg fastener members 33 and 34 respectively are rotated relative to one another to secure and clamp the respective mounting conduit 23 of the first and second clamps to the respective forward and rear legs 31 and 32. In this manner, the switch assembly 30 is fixedly mounted to the cross brace 19. The "U" shaped switch assembly 30 includes a magnetically actuated switch head 35 mounted at a junction of the forward and rear legs 31 and 32 at an upper terminal end of the forward and rear legs 31 and 32. The forward and rear legs include a lower parallel portion that merge into the aforenoted junction mounting the switch head 35, as illustrated in FIG. 4. The switch head 35 is therefore arranged to arcuately deflect due to the deflection of the forward and rear spring hangers 15 and 17 due to the deflection of the forward and rear springs 16 and 18. Upon low tire pressure, the switch head 35 will remain in a constantly deflected orientation, as opposed to deflection due to obstructions and inhalations of an underlying road surface.

To sense such traveling or arcuate displacement of the switch head 35, a switch actuator mount 47 is provided to mount a respective forward and rearward magnet 51 and 52. In use, a switch head and associated switch actuator mount 47, as illustrated in FIG. 4, is utilized to each side of the trailer 11, wherein one side is illustrated in FIG. 13 for purposes of illustration only, where it is understood that an identical construction is presented on an opposed side of the trailer assembly 11. The diagrammatic illustration of FIG. 12 indicates that the switch head 35, including a switch connecting wire 36, is directed rearwardly to connector wire junctions 37 in operative communication with indicator bulb 39 that is typically mounted within an illumination bulb mounting bracket 56 within the tow vehicle 11a of an organization to typically tow the trailer assembly 11. The interface connector 40 between the tow vehicle and the trailer assembly is of conventional construction, and the indicator bulb 39 accordingly operatively associated with the switch heads 35 through the use of an indicator bulb wiring harness 39a. The assembly receives a power supply 38 typically of an automotive battery type to supply power to the DC circuit utilized by the invention.

A trailer flange clamp 41 is utilized, as illustrated in FIG. 7, to secure the switch actuator mount 47 to the trailer flange 14. The clamp 41 includes a respective first and second "U" shaped clamp 42 and 43 that each include a respective first and second clamp flange 44 and 45 that are arranged in a parallel relationship to receive a single or plurality of fasteners 46 therethrough. The fastener or fasteners 46 are arranged to be received orthogonally through a support beam 48 of the switch actuator mount 47, whereupon the trailer flange 14 is received between the first and second "U" shaped clamps 42 and 43 to clamp the same upon tightening of the clamp flange fastener 46. The support beam 48 mounts at its upper terminal end a forward and rear mounting plate 49 and 50 that project forwardly and rearwardly relative to one another relative to the support beam 48 to define an obtuse angle therebetween. The forward mounting plate 49 includes a forward mounting plate slot 49a, wherein the rear mounting plate 50 includes a rear mounting plate slot 50a. The respective forward and rear slots 49a and 50a each adjustably and slidably receive a mounting boss 51a and 52a respectively of the forward and rear magnets 51 and 52 that are secured within the respective forward and rear slots 49a and 50a by respective forward and rear boss fasteners 53 and 54. In this manner, the magnets 51 and 52 are adjusted to actuate the switch head 35 and thereby close the associated circuit dependent upon the requisite degree of arcuate deflection the switch head is effected by a tire loss of air pressure. It is understood that upon a predetermined deflection of one of the forward and rear spring hangers 15 and 17 due to constant deflection of the associated forward and rear spring 16 or 18, the thusly deflected switch head 35 positioned adjacent a respective forward or rear magnet 51 or 52 respectively will effect actuation of the switch and closure of the circuit to present illumination of the indicator bulb 39 mounted within the tow vehicle 11a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer low tire pressure indicator apparatus for securement to a trailer assembly, wherein the trailer assembly includes a forward axle and rear axle, with the forward axle including a forward spring and the rear axle including a rear spring, and a trailer flange positioned between the forward spring and the rear spring.
   a first forward spring hanger mounted to the forward spring positioned adjacent and forwardly of the trailer flange, and a first rear spring hanger mounted to the rear spring positioned adjacent the trailer flange, wherein the trailer flange is positioned between the first forward spring hanger and the first rear spring hanger,
   a cross brace mounted fixedly to the first forward spring hanger and the first rear spring hanger,
   a switch assembly mounted to the cross brace,
   a switch actuator mount fixedly secured to the trailer flange,
   the switch assembly including a magnetically actuated switch head,
   the switch actuator mount including magnet means cooperative with the switch head for directing an electrical signal,
   indicator means remotely spaced from the trailer assembly for receiving the electrical signal to effect actuation of the indicator means.

2. An apparatus as set forth in claim 1 wherein the switch assembly is of a generally "U" shaped configuration and includes a forward leg spaced from and parallel a rear leg, the forward leg and the rear leg joined together at a junction, with the junction mounting the switch head, and the forward leg including a forward leg lower externally threaded portion, and the rear leg including a rear leg lower externally threaded portion adjacent the forward leg externally threaded portion, and the cross brace including a first clamp fixedly receiving the forward leg externally threaded portion, and a second clamp fixedly receiving the rear leg lower externally threaded portion.

3. An apparatus as set forth in claim 2 wherein the first clamp and the second clamp each include an externally threaded rod, the externally threaded rod including a mounting conduit fixedly mounted to the externally threaded rod at a distal end threof, wherein the mounting conduit of each said first clamp and said second clamp receives the respective forward leg lower externally threaded portion and the rear leg lower externally threaded portion respectively therethrough. and the externally threaded rod including a forward clamp leg and a rear clamp leg. and the forward clamp leg mounted to a forward clamp leg tube. and the rear clamp leg mounted to a rear clamp leg tube. the forward clamp leg tube and the rear clamp leg tube each slidably mounted about the externally threaded rod. and the forward clamp leg and the rear clamp leg of. each said clamp receiving the cross brace therebetween. wherein the first clamp and the second clamp are in a spaced parallel relationship secured to the cross brace.

* * * * *